United States Patent
Hall

(10) Patent No.: US 7,600,632 B2
(45) Date of Patent: Oct. 13, 2009

(54) END PROTECTOR LINK FOR CONVEYOR CHAIN

(75) Inventor: William C. Hall, Denver, NC (US)

(73) Assignee: Ramsey Products Corporation, Charlotte, NC (US)

( * ) Notice: Subject to any disclaimer, the term of this patent is extended or adjusted under 35 U.S.C. 154(b) by 949 days.

(21) Appl. No.: 10/534,854

(22) PCT Filed: Feb. 27, 2003

(86) PCT No.: PCT/US03/05973

§ 371 (c)(1), (2), (4) Date: May 13, 2005

(87) PCT Pub. No.: WO2004/043833

PCT Pub. Date: May 27, 2004

(65) Prior Publication Data

US 2006/0054472 A1   Mar. 16, 2006

Related U.S. Application Data

(60) Provisional application No. 60/426,238, filed on Nov. 14, 2002.

(51) Int. Cl.
*B65G 15/56* (2006.01)
*B65G 17/40* (2006.01)

(52) U.S. Cl. .................................. 198/848; 198/851
(58) Field of Classification Search ............... 198/848, 198/851–853
See application file for complete search history.

(56) References Cited

U.S. PATENT DOCUMENTS

| 4,394,901 | A |   | 7/1983  | Roinestad |
| 5,435,435 | A | * | 7/1995  | Chiba et al. .................. 198/853 |
| 5,826,705 | A | * | 10/1998 | Ramsey et al. ............... 198/853 |
| 5,945,187 | A | * | 8/1999  | Buch-Rasmussen et al. .................. 428/36.92 |
| 6,247,582 | B1 |   | 6/2001  | Stebnicki et al. |
| 6,345,715 | B2 | * | 2/2002  | Palmaer ....................... 198/853 |
| 6,347,699 | B1 |   | 2/2002  | Ramsey |
| 6,360,881 | B2 |   | 3/2002  | Stebnicki et al. |
| 6,371,284 | B1 | * | 4/2002  | Pasch .......................... 198/848 |
| 6,382,405 | B1 |   | 5/2002  | Palmaer |
| 6,763,936 | B2 | * | 7/2004  | Marsetti et al. ........... 198/844.1 |
| 2005/0183963 | A1 | * | 8/2005 | Mori et al. .................. 205/668 |

* cited by examiner

*Primary Examiner*—Mark A Deuble
(74) *Attorney, Agent, or Firm*—Adams Intellectual Property Law, P.A.

(57) ABSTRACT

An end protector link (60) captures and retains first and second elongate link pins of a multi-link conveyor chain, and includes an outer wall (41) defining a protective bearing surface, a spacer wall (62) carried by the outer wall, and an inner wall (63) carried by the spacer wall in spaced-apart relation to the outer wall and having a retainer aperture (75) for capturing and retaining respective enlarged heads (13) of the first and second link pins (12) between facing surfaces of the outer wall and the inner wall. The protective bearing surface of the outer wall is adapted for being engaged by wearing surfaces past which the conveyor moves to protect the enlarged heads (13) of the link pins to exposure to the wearing surfaces.

13 Claims, 17 Drawing Sheets

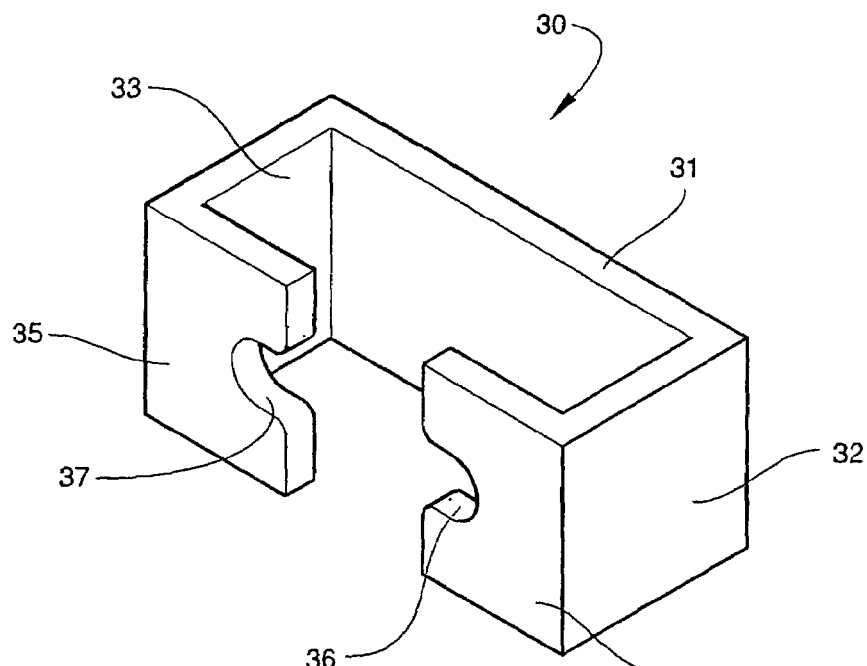
Fig. 4A
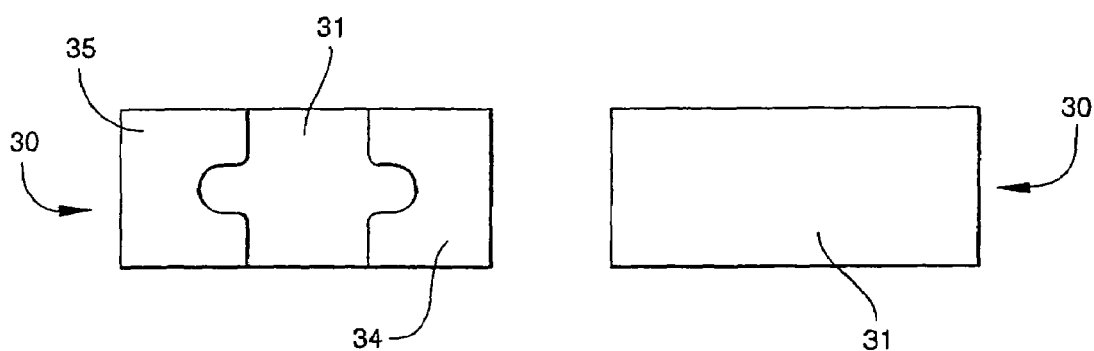
Fig. 4B
Fig. 4C

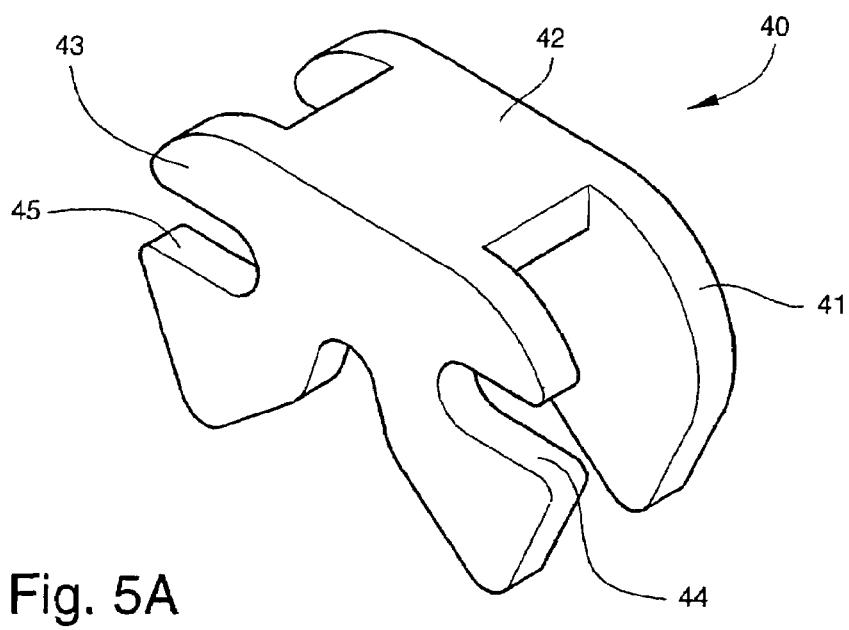
Fig. 5A
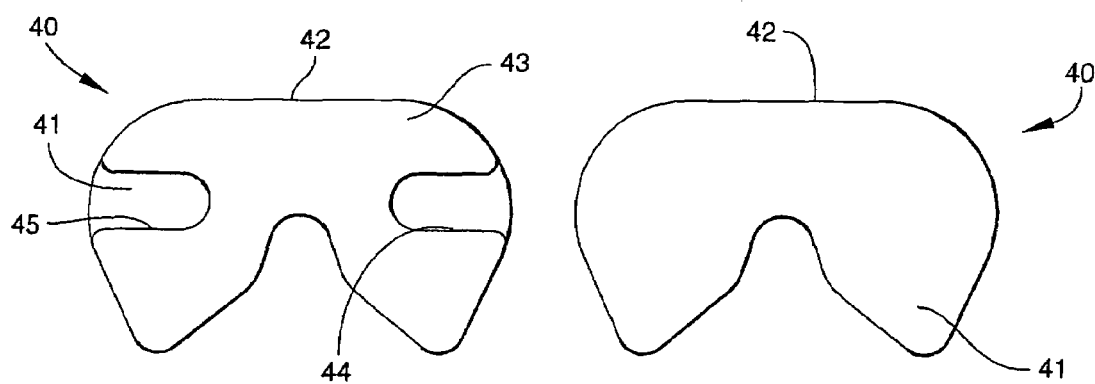
Fig. 5B
Fig. 5C

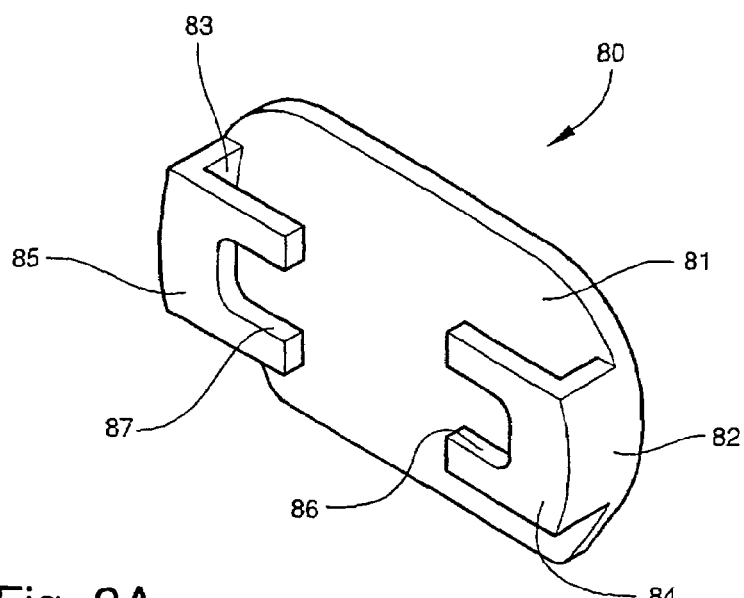
Fig. 9A
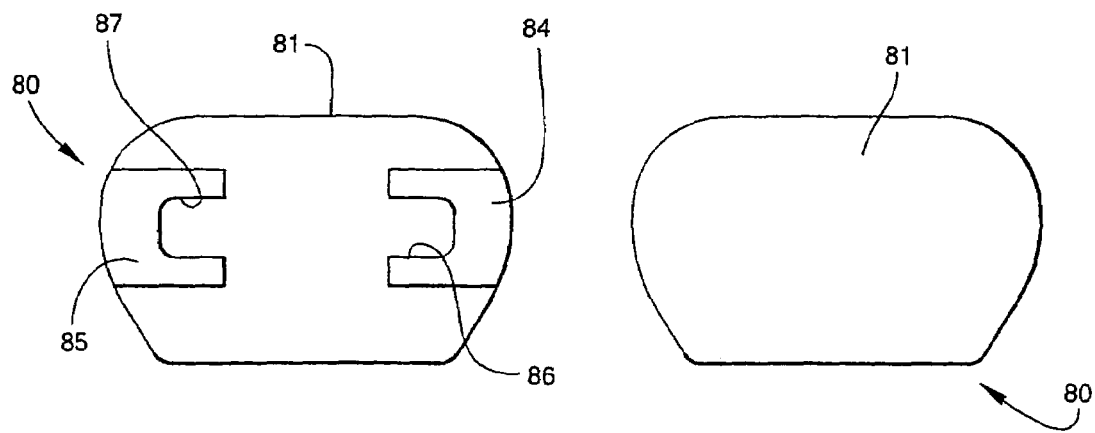
Fig. 9B
Fig. 9C

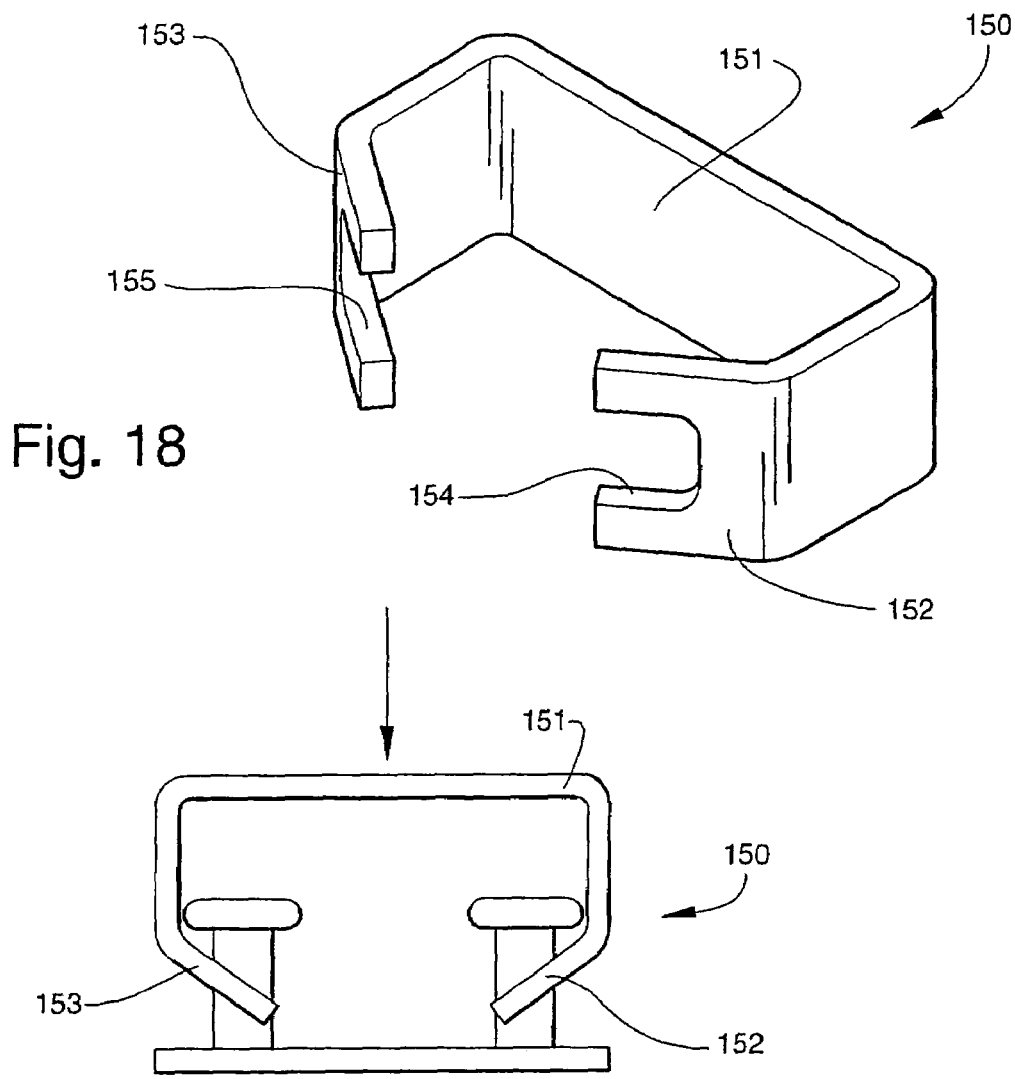
Fig. 18
Fig. 19
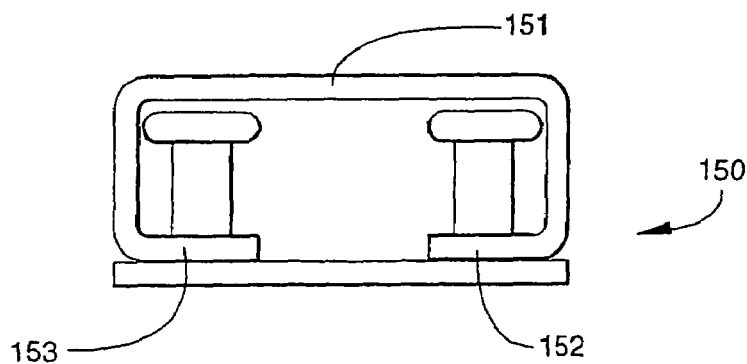
Fig. 20

END PROTECTOR LINK FOR CONVEYOR CHAIN

TECHNICAL FIELD AND BACKGROUND OF THE INVENTION

This invention relates to an end protector link for chains, such as silent or inverted tooth chains. Such chains are frequently used in transporting and conveying materials either as a conveying surface or as the means for moving other containers in which a conveyed material is placed. In such applications, the chain is frequently operated in a path that is bounded by lateral guides, wear strips, or other objects located on either or both sides of the chain. As the chain moves along this path, the ends of the pins projecting from the sides of the chain and the link on the outermost extremity of the chain may rub against the lateral guides, wear strips, or other objects. Eventually this rubbing action will abrade or damage the heads on the ends of these pins. Such wear may also damage links at the outermost extremity of the chain. If the damage or wear to pin heads or links is sufficient the pins and/or links may come out of the chain assembly, effectively destroying the integrity of the chain and damaging the conveying system.

Prior art practices for preventing this problem include providing an end link that has a pair of bores through which the pins extend. The outer facing side of the link is provided with an enlarged counterbore or countersunk segment in which the heads of the respective pins reside. The holes are large enough and deep enough that the heads are recessed below the surface of the link and are thus not directly engaged by any adjacent wear or guide surfaces. This type of link has been used at least since the 1980's. However, the heads of the pins are still exposed, and wear to the surrounding portions of the link can eventually cause wear to the pin heads. Moreover, as wear to other chain components occurs, the heads of the pins may extend outwardly beyond the surface of the end link, causing wear of the type the end link was intended to avoid.

SUMMARY OF THE INVENTION

Therefore, it is an object of the invention to provide an end protector link that prevents abrasion and damage to the heads of link pins of conveyor chains.

It is another object of the invention to provide a protector link that provides smooth, protective wear surfaces to both the side and top of the chain.

It is another object of the invention to provide a protector link that acts to preserve the structural integrity of the chain.

It is another object of the invention to provide a protector link that is easy to install and replace.

The protector link, when affixed to either or both sides of the chain, covers the ends of the headed chain pins sufficiently to protect them from direct contact with lateral guides or other objects, thereby preventing the pin head wear and damage that can occur to normally exposed pin heads. The links at the outermost extremity of the chain may also be protected from damage or wear by the use of the invention. Protector links may be employed at each pitch of a chain where the headed ends of pins would typically be exposed, at select locations along the chain, on one side of a chain, or on both sides of a chain. The use of protector links protects the pin heads and links along the outermost extremity of a chain from wear and damage due to impact, thereby extending chain life and reducing maintenance requirements. In addition, the protector links according to the various embodiments of the invention are useful in providing a top surface that is flush with or slightly lower than the top surface of the conveyor chain in order to facilitate lateral sliding movement of items being conveyed off of the conveyor onto an adjacent support surface. This surface may be treated by polishing, grinding or otherwise in order facilitate this lateral movement.

The protector links according to the several embodiments disclosed herein relate generally to silent or inverted tooth chains with elliptical pin shapes, but the invention is applicable and beneficial to chains of other designs where a riveted or headed pin of other geometry is exposed on the outermost extremities of the chain.

According to one preferred embodiment of the invention, an end protector link is provided for capturing and retaining first and second elongate link pins of a multi-link conveyor chain, and comprises an outer wall defining a protective bearing surface, a spacer wall carried by the outer wall, and an inner wall carried by the spacer wall in spaced-apart relation to the outer wall and having a retainer aperture for capturing and retaining respective enlarged heads of the first and second link pins between facing surfaces of the outer wall and the inner wall. The protective bearing surface of the outer wall is adapted for being engaged by wearing surfaces past which the conveyor moves and protecting the enlarged heads of the link pins to exposure to the wearing surfaces.

According to another preferred embodiment of the invention the spacer wall is normal to the inner wall and the outer wall, and the inner wall and outer wall reside in spaced-apart parallel planes relative to each other, According to yet another preferred embodiment of the invention, the inner wall includes an opening sized to allow the link pin but not the enlarged head of the link pin to pass therethrough.

According to yet another preferred embodiment of the invention, the opposing side edges of the inner and outer walls taper towards each other in a direction away from the spacer wall.

According to yet another preferred embodiment of the invention, the inner and outer wall taper to points defining obliquely-opposed bearing surfaces.

According to yet another preferred embodiment of the invention, the retainer aperture comprises a single opening in the inner wall adapted for receiving the first and second link pins.

According to yet another preferred embodiment of the invention, the retainer aperture comprises a single opening in the inner wall adapted for receiving the first and second link pins. The retainer aperture has a centrally-disposed opening sufficiently large to successively receive the enlarged heads of the first and second link pins. First and second laterally-disposed openings are provided on opposite sides of the centrally-disposed opening. Each of the first and second laterally-disposed openings are sufficiently small to retain the enlarged heads of the link pins between the facing surfaces of the outer wall and the inner wall.

According to yet another preferred embodiment of the invention, an end protector link is provided wherein the spacer wall comprises first and second spacer wall segments carried by opposed side edges of the outer wall. The inner wall comprises first and second inner wall segments carried by respective first and second spacer wall segments, the first and second inner wall segments are mutually opposed in a single plane and define therebetween the retainer aperture for receiving the link pins therethrough.

According to yet another preferred embodiment of the invention, the first and second inner wall segments each include an opposed, inwardly facing recess sufficiently small to retain the enlarged heads of the link pins between the facing surfaces of the outer wall and the inner wall.

According to yet another preferred embodiment of the invention, the spacer wall comprises a wall segment carried by one side edge of the outer wall and a corresponding, opposed side edge of the inner wall. The retainer aperture comprises first and second opposed, outwardly-facing recesses formed in the inner wall and sufficiently small to retain the enlarged heads of the link pins between the facing surfaces of the outer wall and the inner wall.

According to yet another preferred embodiment of the invention, the spacer wall comprises a wall segment carried by one side edge of the outer wall and a corresponding, opposed side edge of the inner wall. The retainer aperture comprises recesses formed in the inner wall, including first and second opposed, outwardly-facing recesses sufficiently small to retain the enlarged heads of the link pins between the facing surfaces of the outer wall and the inner wall. Each of the outwardly-facing recesses has a first, elongate segment for receiving the diameter of the link pin therethrough and a second, rounded segment positioned to retain the captured enlarged head in alignment therewith.

According to yet another preferred embodiment of the invention, the respective side edges of the inner and outer walls remote from the spacer wall are tapered to define obliquely-opposed bearing surfaces.

According to yet another preferred embodiment of the invention, the retainer aperture includes first and second elongate, parallel recesses sufficiently small to retain respective enlarged heads of the link pins between the facing surfaces of the outer wall and the inner wall.

According to yet another preferred embodiment of the invention, a first, elongate segment communicates with a side edge of the inner wall for receiving the diameter of the link pin therethrough, and a second, rounded segment is positioned adjacent to the spacer wall to retain the captured enlarged head in alignment therewith.

According to yet another preferred embodiment of the invention, a multi-link conveyor chain is provided and includes a plurality of conveyor links interconnected in a lengthwise direction and a widthwise direction by a plurality of pairs of the link pins to form a conveyor having a horizontal supporting surface for transporting successive items downstream in a processing line by engagement with a driving element.

An embodiment of the method of protecting capturing and retaining first and second elongate link pins of a multi-link conveyor chain according to the invention comprises the steps of providing an end protector link, comprising an outer wall defining a protective bearing surface, a spacer wall carried by the outer wall and an inner wall carried by the spacer wall in spaced-apart relation to the outer wall. The inner wall has a retainer aperture for capturing and retaining respective enlarged heads of the first and second link pins between facing surfaces of the outer wall and the inner wall, and the protective bearing surface of the outer wall adapted for being engaged by wearing surfaces past which the conveyor moves and protecting the enlarged heads of the link pins to exposure to the wearing surfaces. The respective enlarged heads of the first and second link pins are positioned between the facing surfaces of the outer wall and the inner wall. The end protector link is manipulated to retain the respective enlarged heads of the first and second link pins between the facing surfaces of the outer wall and the inner wall.

According to yet another preferred embodiment of the invention, the step of manipulating the end protector link comprises the step of connecting the end protector link to a plurality of conveyor links by means of the link pins whereby the link pins are locked in spaced relation to each other and to the conveyor links.

According to yet another preferred embodiment of the invention, the step of manipulating the end protector link comprises the step of bending the outer wall from an initial outwardly-extending oblique link pin loading position to a link pin locking position wherein the plane of the outer wall is parallel to the plane of the inner wall with the heads of the link pins captured therebetween.

According to yet another preferred embodiment of the invention, the step of manipulating the end protector link comprises the step of bending two opposed segments of the outer wall from respective, initial outwardly-extending oblique link pin loading positions to respective link pin locking positions wherein the plane of the first and second outer wall segments are parallel to the plane of the inner wall with the head of a respective link pin captured by a respective one of the first and second outer wall segments.

According to yet another preferred embodiment of the invention, the step of manipulating the end protector link comprises the step of bending two opposed segments of the inner wall from respective, initial inwardly-extending oblique link pin loading positions to respective link pin locking positions wherein the plane of the first and second inner wall segments are parallel to the plane of the outer wall with the head of a respective link pin captured by a respective one of the first and second inner wall segments.

BRIEF DESCRIPTION OF THE DRAWINGS

Some of the objects of the invention have been set forth above. Other objects and advantages of the invention will appear as the invention proceeds when taken in conjunction with the following drawings, in which:

FIGS. 4A, 4B, and 4C are a perspective view, front elevation and rear elevation, respectively, of a further alternative embodiment of the protector link;

FIGS. 5A, 5B, and 5C are a perspective view, front elevation and rear elevation, respectively, of a further alternative embodiment of the protector link for use on an inverted tooth link type of conveyor;

FIGS. 9A, 9B, and 9C are a perspective view, inner side elevation and outer side elevation, respectively, of a further alternative embodiment of the protector link;

FIG. 18 is a perspective view of a further embodiment of a protector link according to the invention;

FIGS. 19 and 20 are top plan views showing placement of the protector link according to FIG. 18 onto the pins;

DESCRIPTION OF THE PREFERRED EMBODIMENT AND BEST MODE

Figure 1:
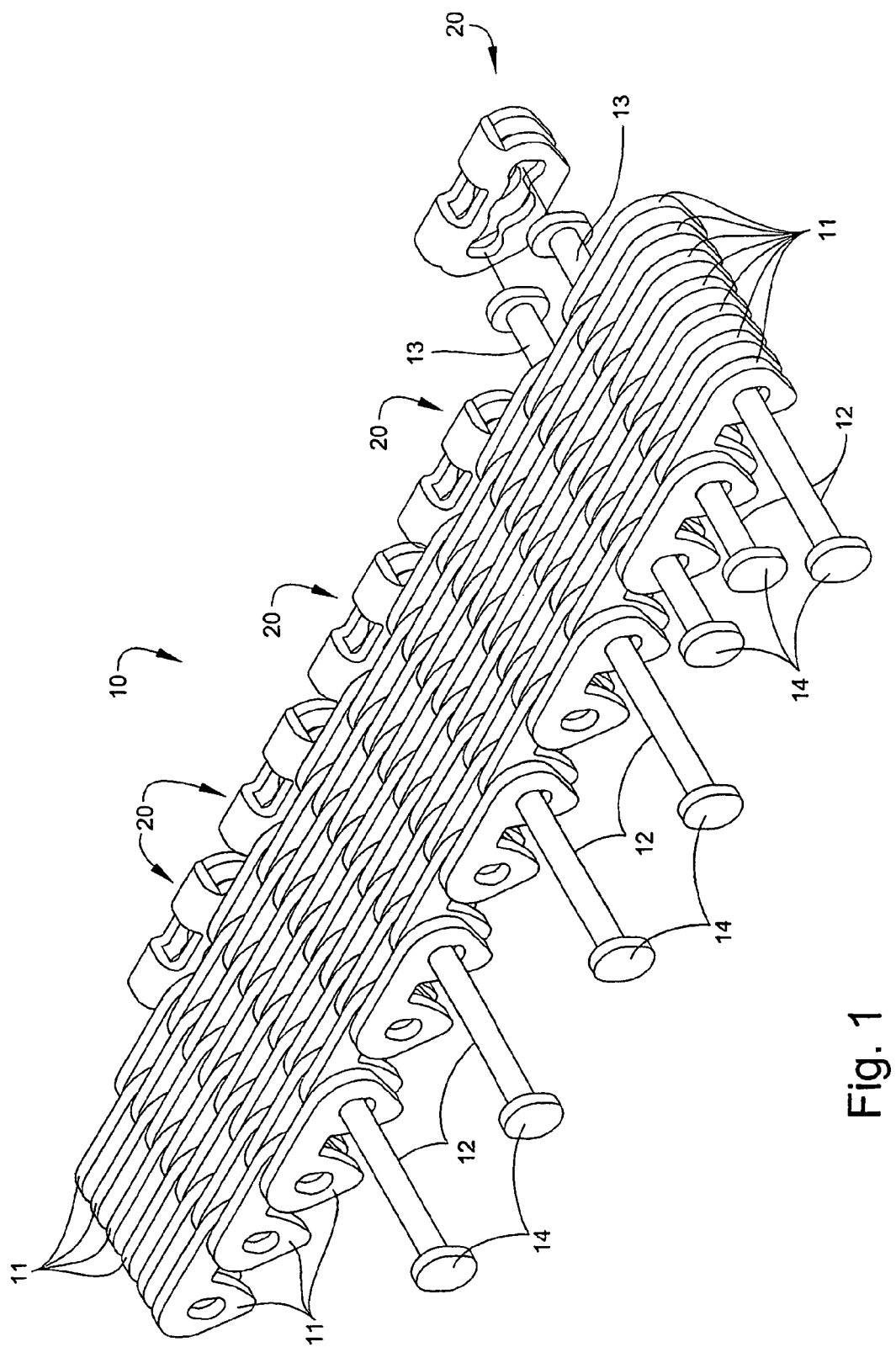
FIG. 1 is a fragmentary view of a length of an assembled conveyor chain incorporating end protector links according to a preferred embodiment of the invention.

Referring now specifically to the drawings, a conveyor chain according to an embodiment of the present invention is illustrated in FIG. 1 and shown generally at reference numeral 10. The chain 10 is formed of a multitude of interconnected links 11 threaded onto link pins 12, as shown. One typical manner of assembling the chain 10 is by using pins 12 with a head 13 on only one end, threading the links in the required sequence and arrangement onto the shaft of the pins over the headless end, and utilizing the head to retain the links. After the full width of the chain 10 is assembled, a head 14 is applied to the previously headless end, for example, by spin riveting. The pins 12 are typically elliptical or ovoid in cross-section to facilitate movement within the links 11.

As noted above, chains such as chain 10 are frequently used in the transport and conveying of materials either as a conveying surface, or as the means for moving other containers in which a conveyed material is placed. In such applications, the chain is frequently operated in a path that is bounded by lateral guides, wear strips, or other objects located on either or both sides of the chain. As the chain moves along this path, the ends of the links pins projecting from the sides of the chain and the link on the outermost extremity of the chain may rub against the adjacent surfaces. The heads may eventually wear away, allowing the links to slide off of the pin and damage the chain.

In accordance with the invention a protector link 20 is thus provided to prevent wear to the head 13 of the pin 12.

Figure 2:
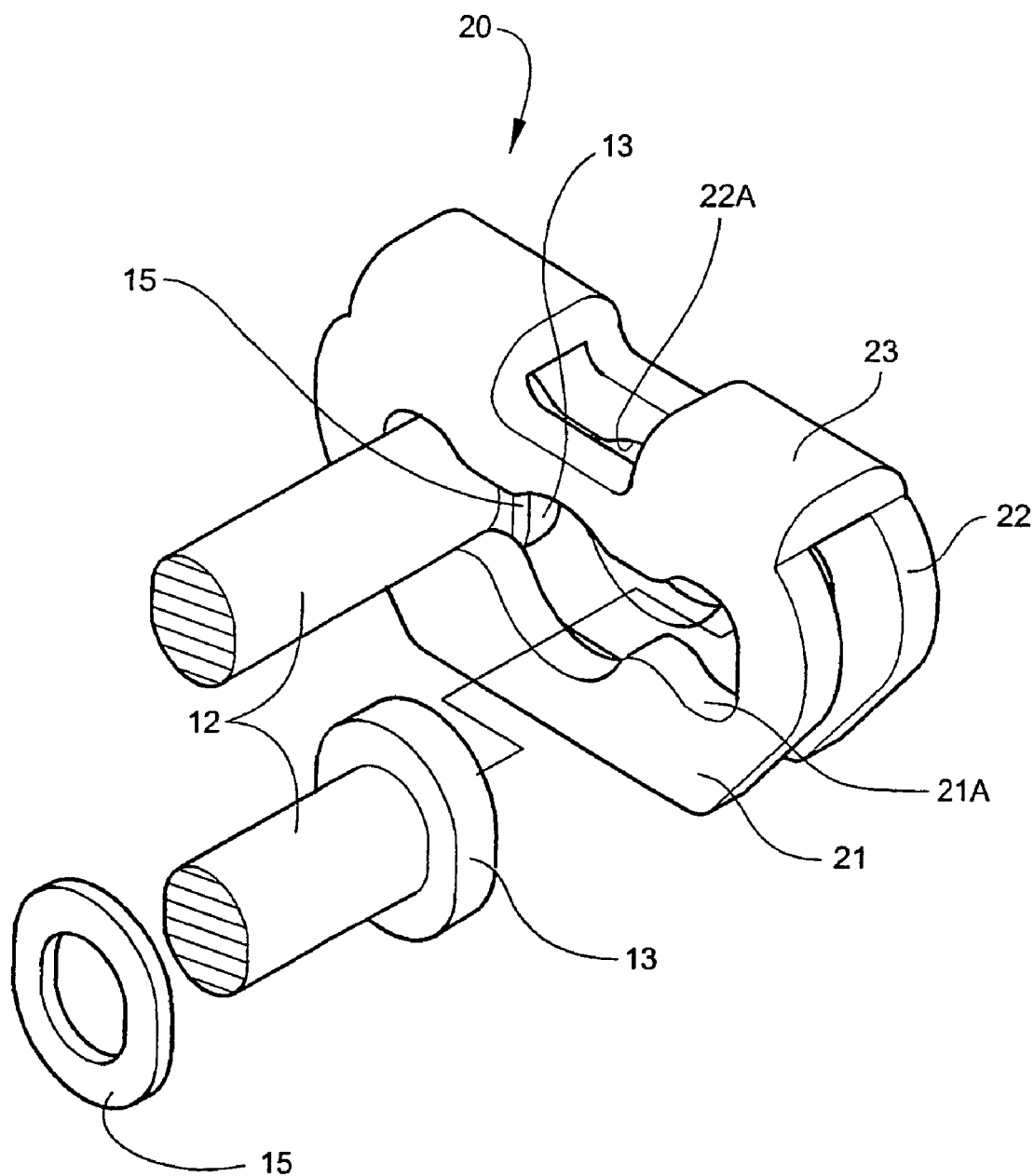
FIG. 2 is an enlarged fragmentary view of a single end protector link according to FIG. 1 showing the manner of link pin insertion.

Referring now to FIG. 2, the protector link 20 is preferably fabricated from steel or steel alloy. Inner and outer walls 21 and 22 have planar surfaces with an integral material connection between them in the form of a spacer wall 23.

The inner wall 21 and outer wall 22 contain retainer apertures 21A, 22A through which the pin 12 and the head 13 may pass during the chain assembly process. In the particular embodiment shown in FIG. 2, each head 13 is passed through the large, central lobe of the retainer aperture 21A in the shown orientation and then the protector link 20 is shifted laterally, moving the heads 13 into the smaller lateral lobes where they are captured. Retainer apertures 21A, 22A permit the protector link to be used with either wall 21 or 22 facing inwardly. Once the chain 10 is assembled, the head 13 prevents the pins 12 from passing back through the apertures 21A, 22A through which it entered, thereby retaining the protector link 20 on the chain 10.

The outer link surface is sufficient in area to partially or completely cover the heads 13 on the end of pins 12. The distance between inner and outer walls 21 and 22 is sufficient to enclose the heads 13 of the pins 12 without interfering with the rotation or movement of the pins 12 as the link 20 pivots during its movement cycle. The material connection between the inner and outer walls 21, 22 may vary in location and extent so long as it does not interfere with the operation of the chain.

In a completed chain 10 the inner and outer walls 21, 22 of the protector link 20 are essentially in parallel geometric planes. However, prior to final assembly the surfaces may not be parallel in order to facilitate the insertion of pins 12. The peripheral geometry of inner and outer walls 21, 22 can be varied to provide additional functionality and benefits within the chain 10. As is shown in FIG. 2, a washer may be used on the pins 12 in instances when the head 13 is not large enough to adequately fill the space between the inner and outer walls 21 and 22. This requirement can occur when the material characteristics and manufacturing requirements result in a space substantially deeper than the head 13. The washer 15 accommodates this additional space and thus improves operation of the chain 10. In addition, the washer 15 provides an improved sliding action between the heads 13 and the interior surfaces of the inner and outer walls 21 and 22. Outer and/or inner walls may alternatively have a peripheral geometry that is essentially the same as other links within the chain 10 that are designed to engage sprockets and transmit power or motion. See FIGS. 5, 7, 10, 15 and 21. Outer and/or inner walls may have a peripheral geometry that is essentially the same as other links within the chain that are designed to guide and retain the chain on the sprockets. See FIGS. 6, 8, 9, 11.

The outer and/or inner walls may have a peripheral geometry that is substantially different from other links within the chain but are such that the design and/or location of the inner and outer surfaces do not interfere with normal chain-sprocket engagement and material transport. See FIGS. 4, 12, 14, 16. The outer and/or inner walls may also have a peripheral geometry that facilitates the smooth transport of materials on the chain. The outer and/or inner walls may have a peripheral geometry that provides for attaching other objects to the chain.

Protector links may be affixed to one or both sides of a chain assembly. Protector links may be constructed of a heat treatable steel alloy or other wear resistant materials. Protector links may have a laminate construction with the inner and outer link surfaces being made of different materials. Protector links may be included in a chain by various methods and the geometry of inner and outer plates may be varied to allow for a particular assembly method.

Figure 3:
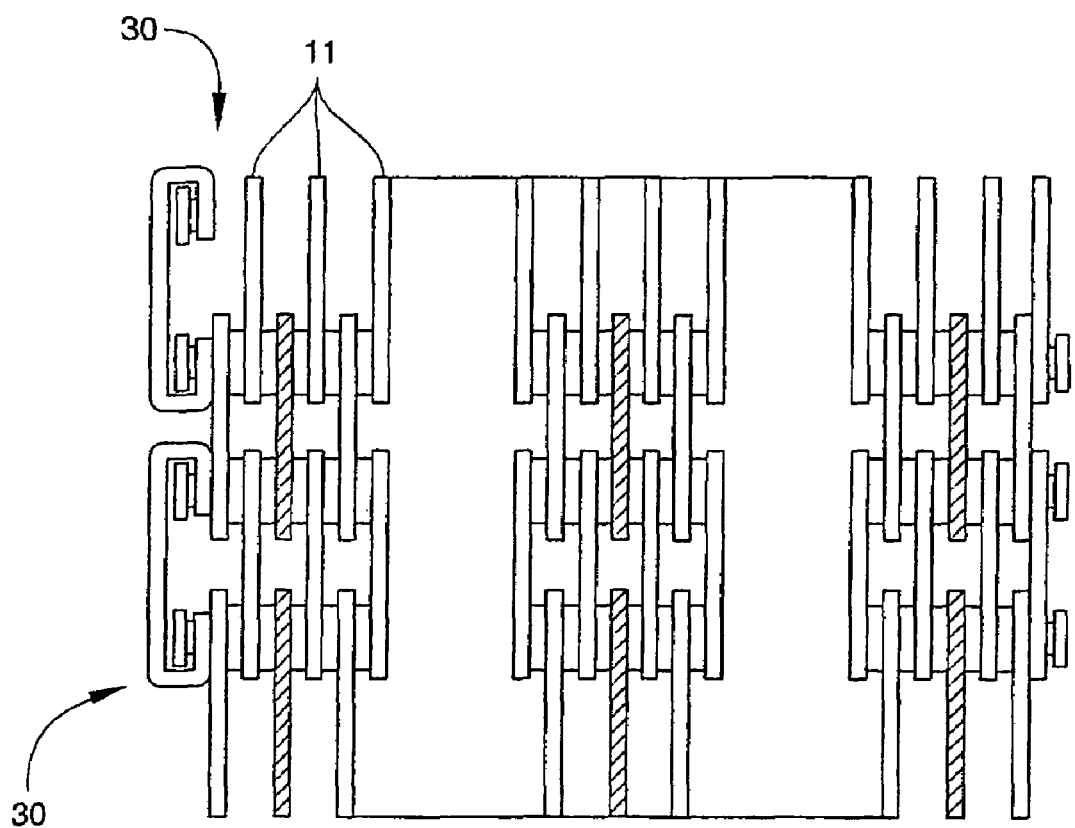
FIG. 3 is a top plan view of an assembled conveyor chain incorporating end protector links according to another preferred embodiment.

Referring now these drawings, the protector link 20 shown in FIGS. 2 and 3 has been described above.

As is shown in FIGS. 4A-4C, a protector link 30 has an outer wall 31, two opposed side walls 32, 33 and two inwardly-facing, opposed inner wall segments 34 and 35. Inner wall segments 34 and 35 have respective generally semicircular notches 36, 37 into which link pins are fitted.

Referring now to FIGS. 5A-C, a protector link 40 has an outer Wall 41, a top wall 42 and an inner wall 43. The inner wall 43 includes two outwardly-facing opposed, elongate notches 44, 45 into which pins are fitted. The bottom extent of the outer and inner walls 41, 42 are shaped with a peripheral geometry that is essentially the same as other links within the chain and is designed to engage sprockets and transmit power or motion, as referenced above.

Figure 6A:
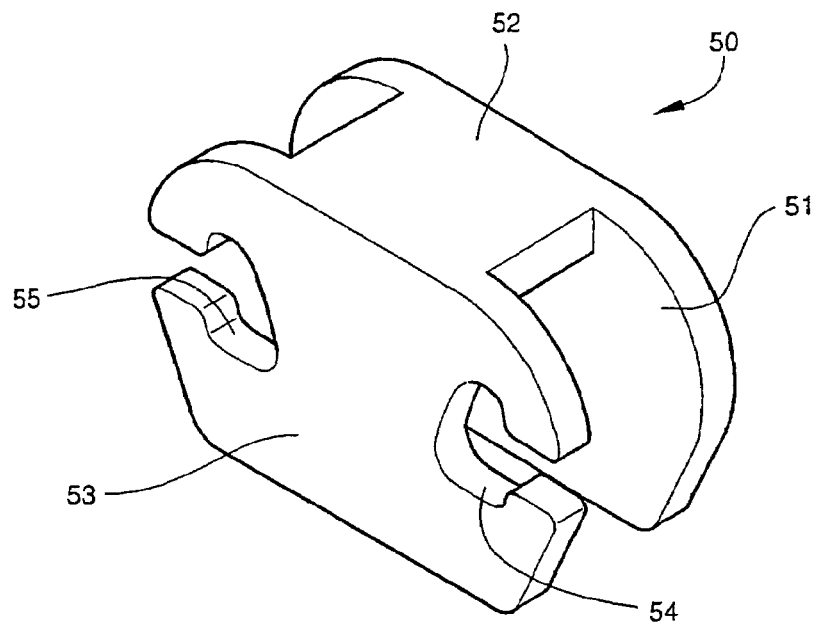
FIGS. 6A, 6B, and 6C are a perspective view, inner elevation and outer elevation, respectively, of a further alternative embodiment of the protector link.
Figures 6B, 6C:
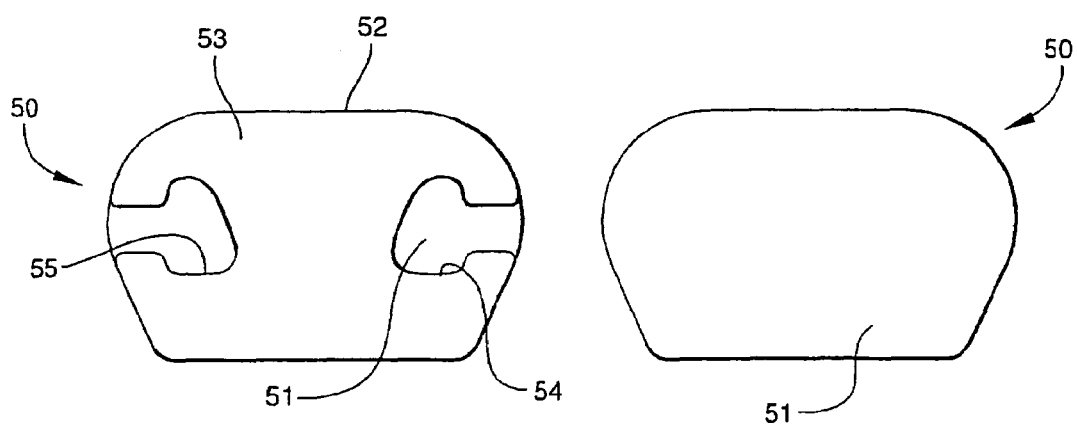

Referring now to FIGS. 6A-C, a protector link 50 has an outer wall 51, a top wall 52 and an inner wall 53. The inner wall 53 includes two outwardly-facing opposed, elongate notches 54, 55 into which pins are fitted. The bottom extent of the outer and inner walls 51, 52 are shaped with a peripheral geometry that is essentially the same as other links within the chain that are designed to guide and retain the chain on the sprockets.

Figure 7A:
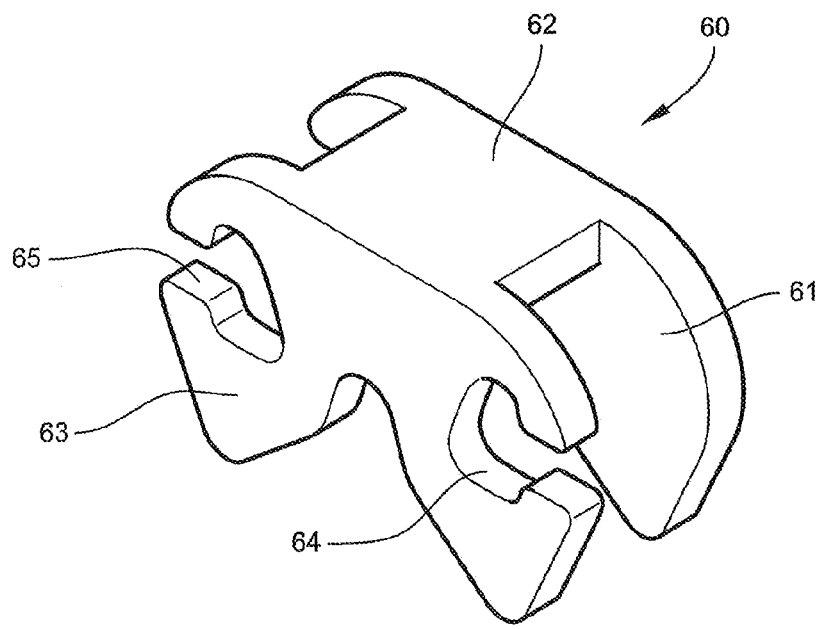
FIGS. 7A, 7B, and 7C are a perspective view, inner side elevation and outer side elevation, respectively, of a further alternative embodiment of the protector link.
Figures 7B, 7C:
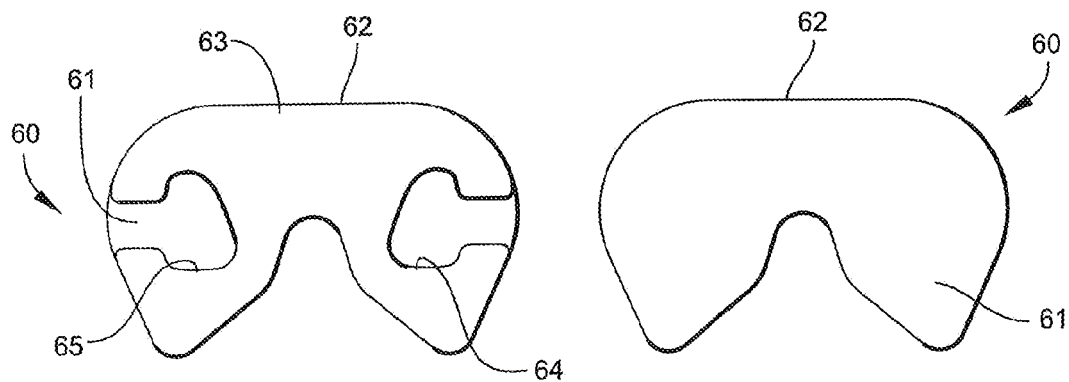

As shown in FIGS. 7A-C, a protector link 60 has an outer wall 61, a top spacer wall 62 and an inner wall 63. The inner wall 63 includes two outwardly-facing opposed, elongate notches 64, 65 into which pins are fitted. The bottom extent of the outer and inner walls 61, 63 are shaped with a peripheral geometry that is essentially the same as other links within the chain and is designed to engage sprockets and transmit power or motion, as referenced above.

Figure 8A:
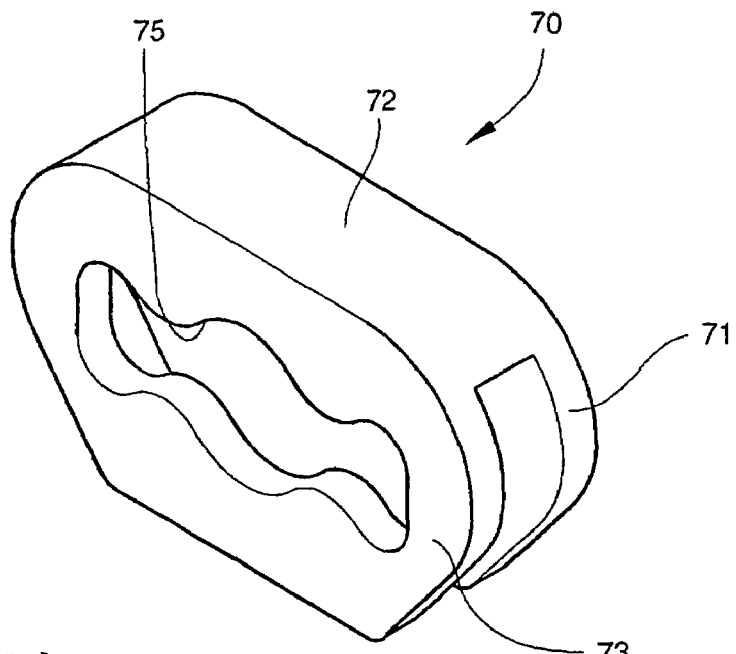
FIGS. 8A, 8B, and 8C are a perspective view, inner side elevation and side edge elevation, respectively, of a further alternative embodiment of the protector link.
Figures 8B, 8C:
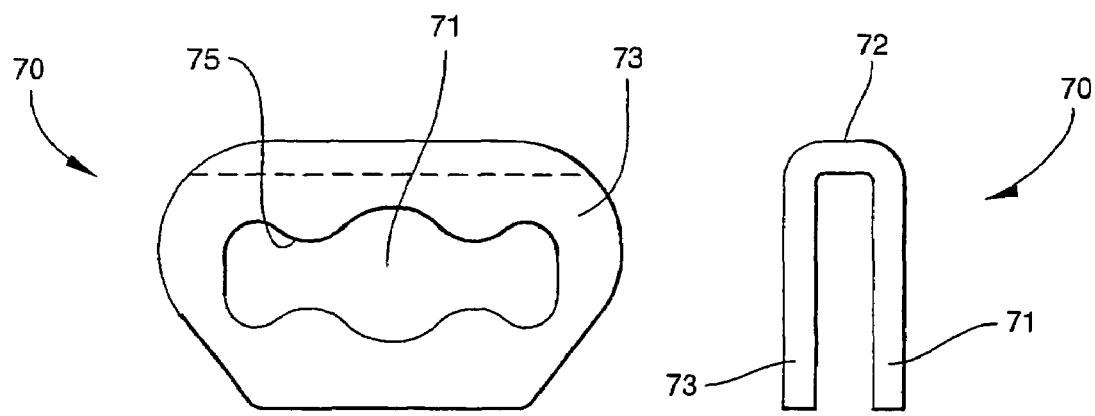

Referring now to FIGS. 8A-C, a protector link 70 has an outer wall 71, a top spacer wall 72 and an inner wall 73. The inner wall 73 includes an elongate retainer aperture 75 into which pins are fitted. The retainer aperture 75 provides access through which a pair of pins may pass during the chain assembly process. In the particular embodiment shown in FIGS. 8A-C, the head of both pins are passed through the large, central lobe of the retainer aperture 75, one at a time, and then shifted laterally, moving the heads into the smaller lateral lobes, where they are captured. The bottom extent of the outer and inner walls 71, 73 are shaped with a peripheral geometry that is essentially the same as other links within the chain that are designed to guide and retain the chain on the sprockets.

As is shown in FIGS. 9A-4C, a protector link 80 has an outer wall 31, two opposed side spacer walls 82, 83 and two inwardly-facing, opposed inner wall segments 84 and 85. Inner wall segments 84 and 85 have respective elongate notches 86, 87 into which pins are fitted.

Figure 10A:
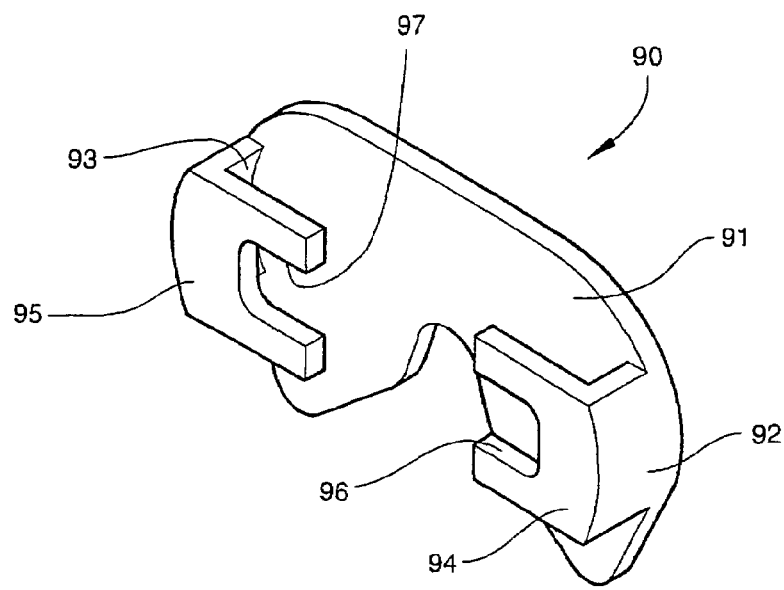
FIGS. 10A, 10B, and 10C are a perspective view, inner side elevation and outer side elevation, respectively, of a further alternative embodiment of the protector link.
Figures 10B, 10C:
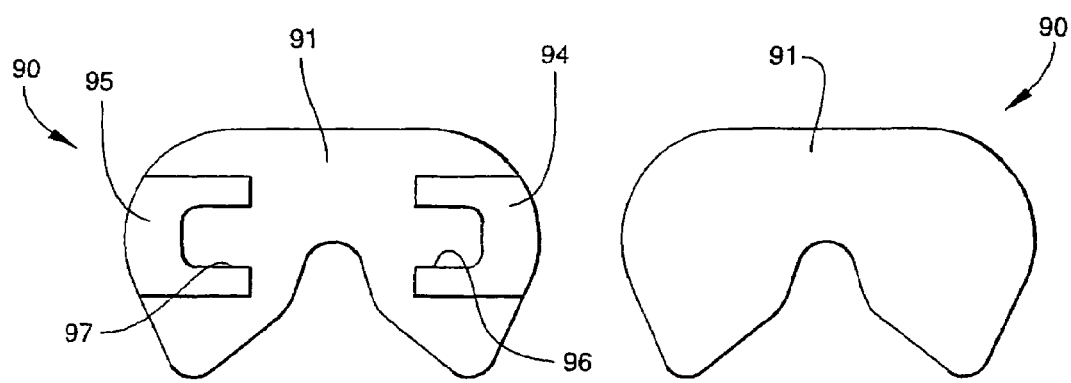

A protector link 90 with a design similar to that of FIGS. 9A-C, but with a peripheral geometry that permits the link 90 to engage drive sprockets and transmit power or motion, is shown in FIGS. 10A-C. The protector link 90 has an outer wall 91, two opposed side spacer walls 92, 93 and two inwardly-facing, opposed inner wall segments 94 and 95. The inner wall segments 94 and 95 have respective elongate notches 96, 97 into which pins are fitted.

Figure 11A:
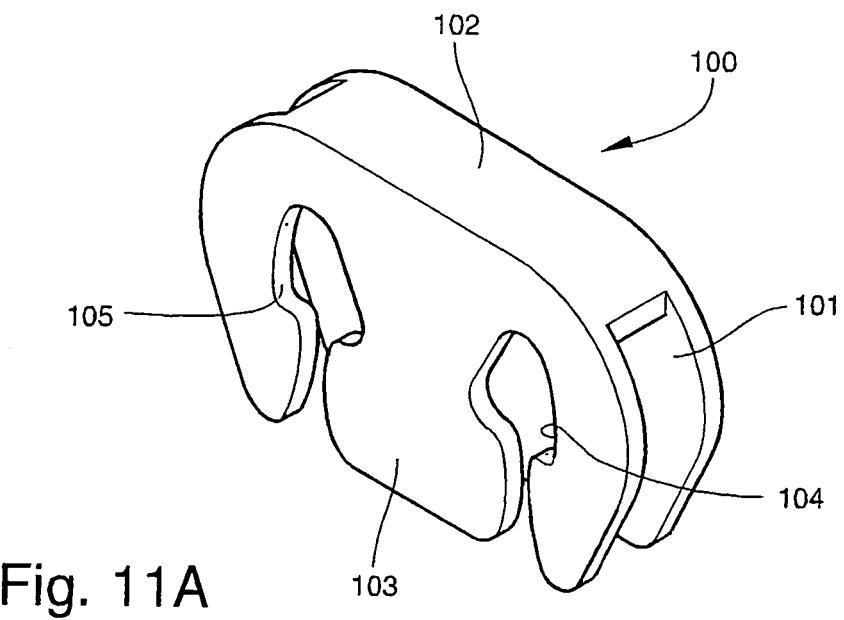
FIGS. 11A, 11B, and 11C are a perspective view,. inner side elevation and outer side elevation, respectively, of a further alternative embodiment of the protector link.
Figures 11B, 11C:
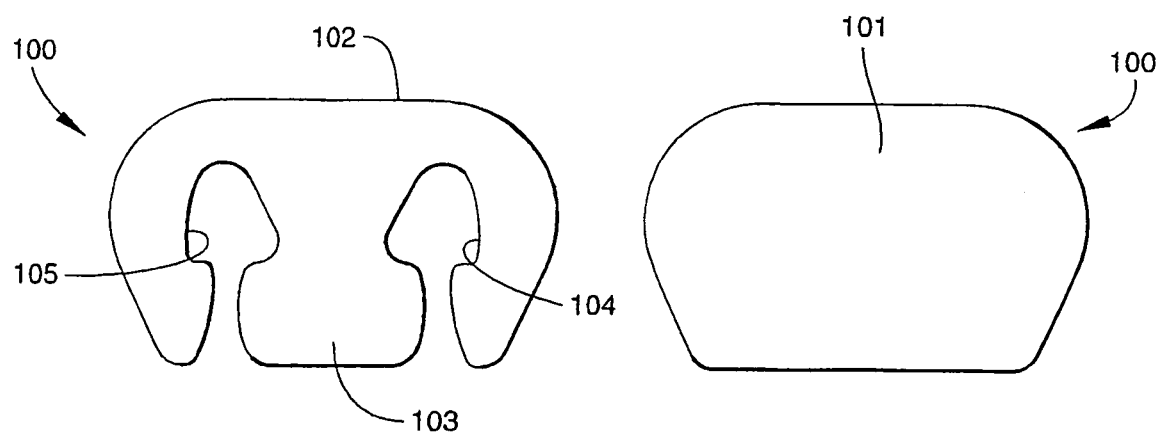

Referring now to FIGS. 11A-C, a protector link 100 has an outer wall 101, a top spacer wall 102 and an inner wall 103. The inner wall 103 includes two elongate, vertically-extending retainer apertures 104 and 105 into which the pins are fitted. In the particular embodiment shown in FIGS. 11A-C, the head of both pins is passed through the narrow portion of the apertures 104, 105 and are captured in the enlarged area of the apertures. The outer and inner walls 71, 72 are shaped with a peripheral geometry that is essentially the same as other links within the chain that are designed to guide and retain the chain on the sprockets. In this particular embodiment, the protector link 100 is attached to one or both sides of a chain after both ends of the chain pins have been headed or riveted. To facilitate attachment of the protector link 100, the side of the chain to which the protector link is to be attached is constructed such that the pins extend from the side of the outermost link sufficiently to create a gap between the bottom of the pin heads and the outer surface of the outermost link. The gap is large enough to allow the inner wall 103 of the protector link 100 to fit between the bottom of the heads and the surface of the outermost link. The protector link 100 is inserted in the chain by applying forces sufficient in magnitude and direction that the protector link 100 undergoes sufficient elastic deformation to allow it to be positioned in its preferred orientation relative to the pins. Once the protector link 100 is in the proper position, the positioning forces are removed and the protector link is retained on the pins by the geometry of the retainer apertures 104, 105 in the inner wall 103 through which the pins pass and the elastic properties of the material, typically steel, of which it is constructed. The outer surface of the protector link is sufficient to cover the heads of the pins and prevent them from exiting the chain or from being impacted by lateral objects.

Figure 12:
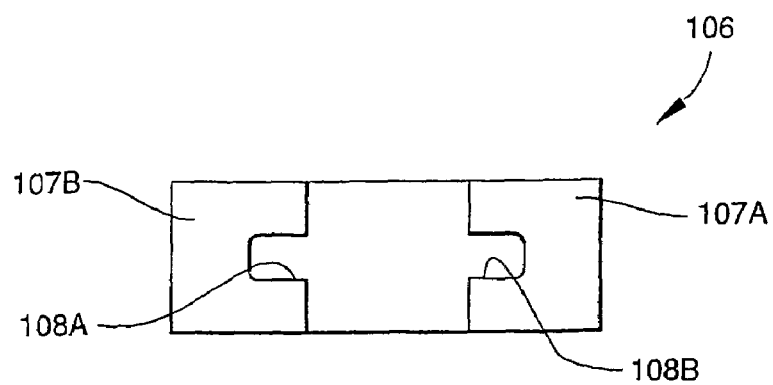
FIG. 12 is an inner side elevation of a further alternative embodiment of the protector link, similar to FIGS. 4A-C.
Figure 13:
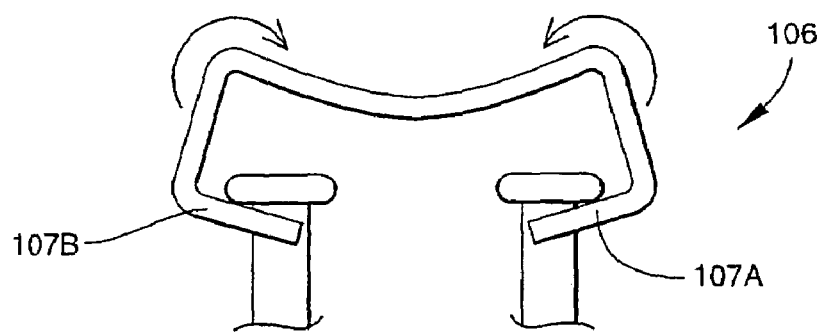
FIGS. 13 and 14 are top plan views of the inner side of the protector link according to FIG. 12, sequentially showing placement of the link on the pins.
Figure 14:
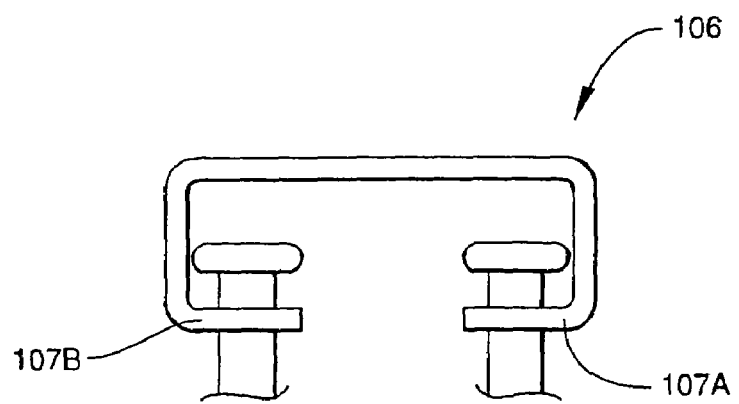

A similar arrangement is shown in FIGS. 12-14, where a protector link 106 is deformed sufficiently from an original position to place it over the heads of two adjacent pins, FIG. 13. When the deforming forces are released, FIG. 14. Inner wall segments 107A, 107B of the protector link 106 resume their original position, locking the pins in the respective retainer apertures 108A, 108B.

Figure 25:
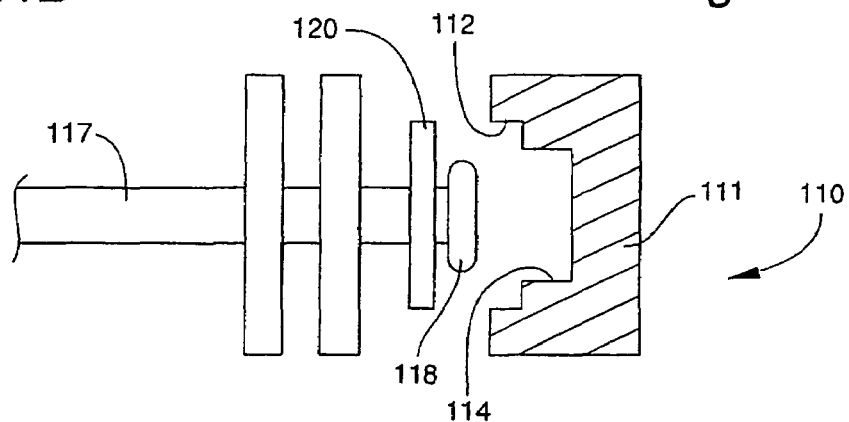
FIGS. 25 and 26 are side elevation views showing placement of the protector link according to FIGS. 24A-C onto the pins.
Figure 26:
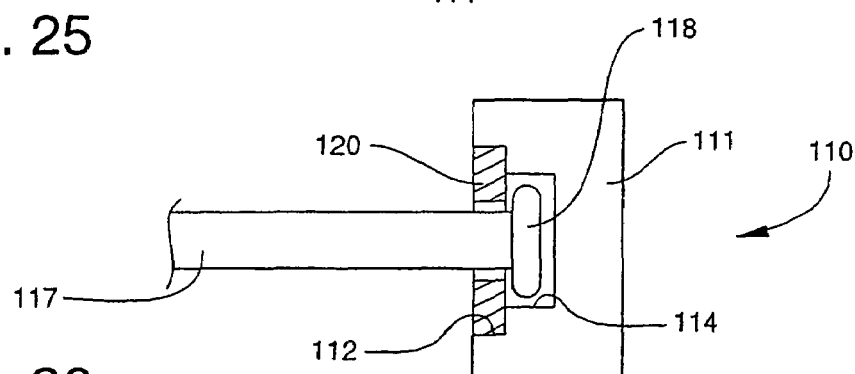

Referring now to FIGS. 24A-C and 25-26, a further embodiment is disclosed. The protector link 110 includes an outer wall 111, an inner wall 112, a surrounding spacer wall 113, and a pair of spaced-apart retainer apertures 114 and 115. Pins are connected to the protector link 110 by inserting the head of the pin into one of the-retainer apertures 114 or 115. As shown in FIGS. 25 and 26, a pin 117 with a head 118 is connected to the protector link 110 by inserting the head 119 into, for example, retainer aperture 114. A cap 120 carried on the pin 117 is mated to the protector link 110 by fitting it into a shoulder of the spacer wall 113 and inner wall 112 and securing it by welding, epoxy cement or other suitable attachment method.

Figure 27:
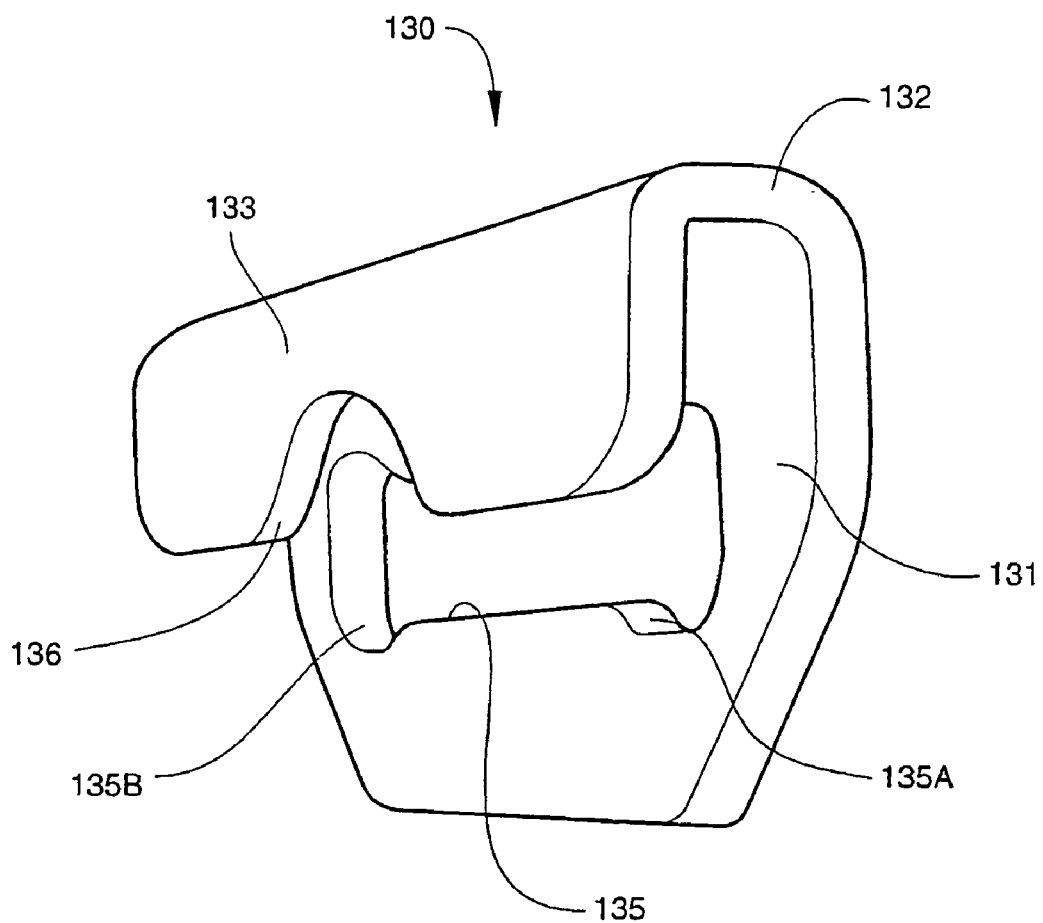
FIG. 27 is a perspective view of a further embodiment of a protector link according to the invention.

As is shown in FIG. 27, a protector link 130 has an inner wall 131, a top spacer wall 132 and an outer wall 133. The inner wall 131 includes an elongate retainer aperture 135 into which pins are fitted. A notch 136 in the outer wall 133 provides access through which a pair of pins may pass during the chain assembly process. In the particular embodiment shown in FIG. 27, a non-headed end of two pins are passed through the notch 136 one at a time and through the retainer aperture 135. The head on the end of each pin is sufficiently large to be captured by the retainer aperture 135. Each pin is then shifted laterally into the enlarged areas 135A, 135B on opposing ends of the retainer aperture 135, where they reside during operation of the chain. The bottom extent of the inner wall 131 is shaped with a peripheral geometry that is essentially the same as other links within the chain that are designed to guide and retain the chain on the sprockets.

With regard to each of the above-referenced embodiments in FIGS. 2-10, 24-26 and 27, the link is attached to one or both sides of a chain before both ends of the pin have been headed or riveted. Two pins with a head or rivet on one end are inserted through the retainer apertures in the inner wall so that the head or rivet resides in the space between the inner and outer walls. The retainer apertures are sized and shaped to allow the insertion of the elliptical pin cross-section in a preferred orientation but will not allow the headed or riveted end of the pin to pass through the retainer aperture once it is in its final position within the chain. The unriveted or unheaded ends of the pins extending from the protector link are inserted into other links in the chain assembly that have apertures that determine the final position and location of pins within the chain. With the pins in their final position and location in the chain, the size, spacing and geometry of the aperture retainers in the inner link wall are such that the riveted or headed ends of the pin cannot pass through them, and the link is thereby retained on the side of the chain. The outer wall of the protector link is sufficient to cover the pin heads and prevent the heads from exiting the chain or from being impacted by lateral objects. The unheaded ends of the pins that project from the other side of the chain are then riveted or headed using common heading or riveting processes.

Referring now generally to FIGS. 15 A-C and 18-23, in these exemplary designs the protector link is attached to the one or both sides of a chain before both ends of the pin have been headed or riveted and before or after the protector link has been deformed into its final shape. Two pins with a head or rivet on one end are inserted through retainer apertures in the inner protector link wall so that the head or rivet resides in the space between the inner and outer link surfaces. The retainer apertures are sized to allow the insertion of the pin cross-section in a preferred orientation. The outer or inner wall is then deformed into its final orientation so that inner and outer walls are essentially in parallel planes. In this position the headed or riveted ends of the pins will not pass through the retainer apertures in the inner wall. Also, the extent of coverage of the outer wall of the link is sufficient to cover the pinheads and prevent them from projecting beyond the plane of the outer wall. The unriveted/headed ends of the pins extending from the protector link are then inserted into other links in the chain assembly that determine the final position and location of pins within the chain. With the pins in their final position the retainer apertures in the inner wall are such that the riveted or headed ends of the pins cannot pass through them and the link is retained on the side of the chain.

Figure 15A:
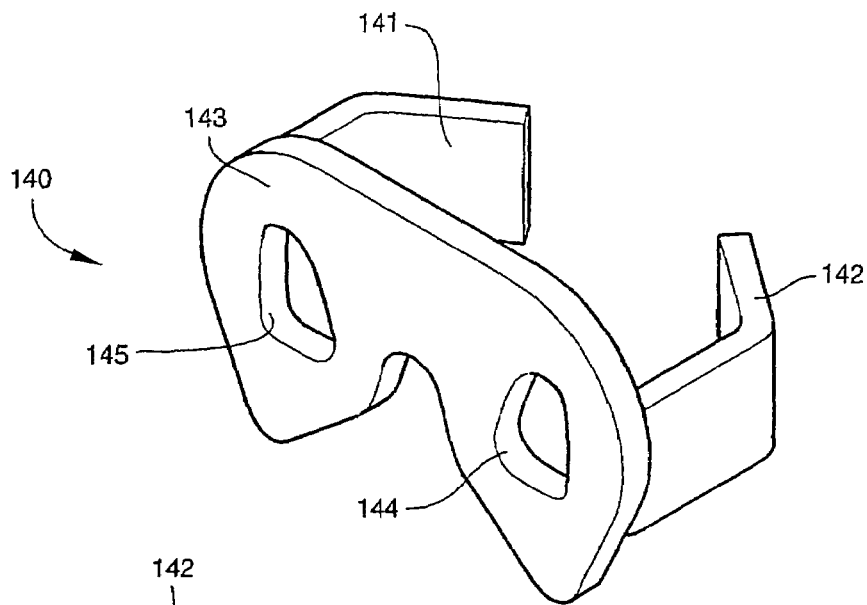
FIGS. 15A, 15B, and 15C are a perspective view, inner side elevation and outer side elevation, respectively, of a further alternative embodiment of the protector link.
Figure 16:
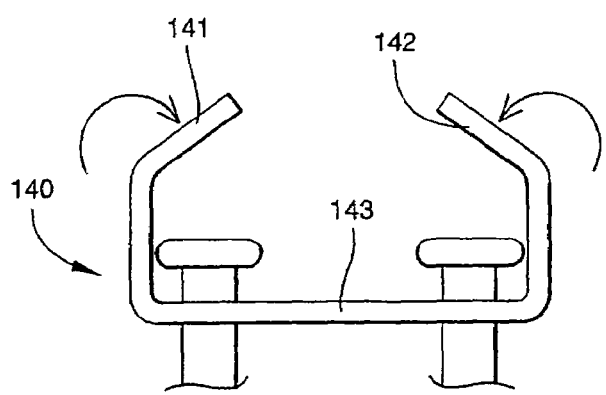
FIGS. 16 and 17 are top plan views showing placement of the protector link according to FIGS. 15A-C onto the pins.
Figure 17:
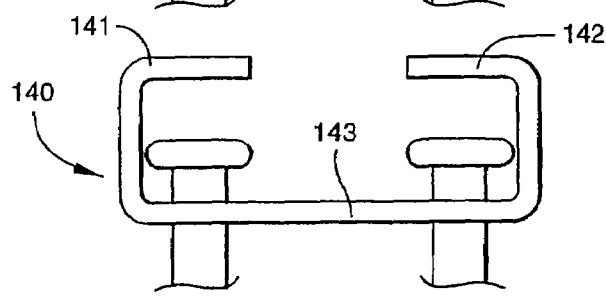
Figure 15B:
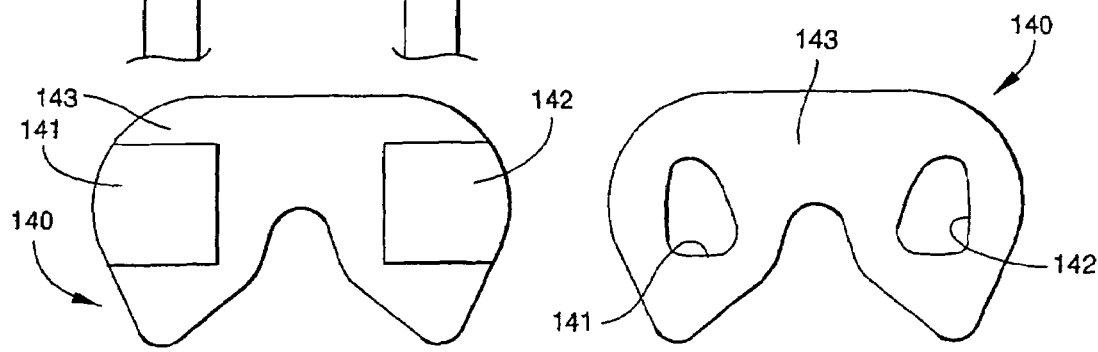
Figure 15C:
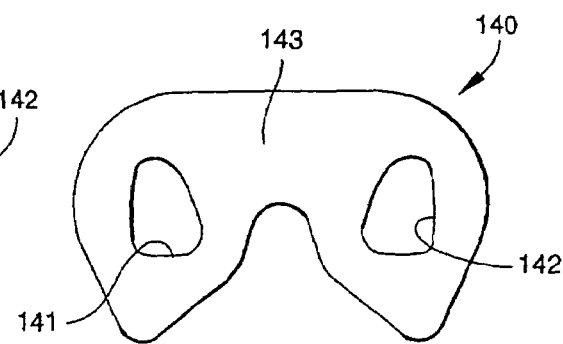

Referring now specifically to FIGS. 15A-C, protector link 140 has two outer wall segments 141, 142 and an inner wall 143. The inner wall 143 includes two retainer apertures 144, 145 into which pins are fitted. The bottom extent of the inner wall 143 is shaped with a peripheral geometry that is essentially the same as other links within the chain that are designed to mate with the drive sprockets for providing motion to the chain. As is best shown in FIGS. 15A and 16, the outer wall segments 141, 142 are initially spread outwardly at an oblique angle to the plane of the inner wall 143 sufficiently to allow the pins to be inserted, one-by-one, past the outer wall segments 141, 142 and through the retainer apertures 144, 145. After pin insertion the outer wall segments 141, 142 are bent inwardly until they are generally parallel with the plane of the inner wall 143, as shown in FIG. 17.

A similar embodiment is shown in FIGS. 18, 19 and 20. A protector link 150 has an outer wall segment 151 and two inner wall segments 152 and 153. The inner wall segments 152, 153 include respective retainer apertures 154, 155 in the form of notches into which pins are fitted. As is best shown in FIGS. 18 and 19, the inner wall segments 152, 153 are initially spread outwardly at an oblique angle to the plane of the outer wall 151 sufficiently to allow the head of the pins to be inserted past the wall segments 152, 153 and captured in the notches defining the retainer apertures 154, 155. After pin insertion the inner wall segments 152, 153 are bent inwardly until they are generally parallel with the plane of the outer wall 151, as shown in FIG. 17.

Figure 21A:
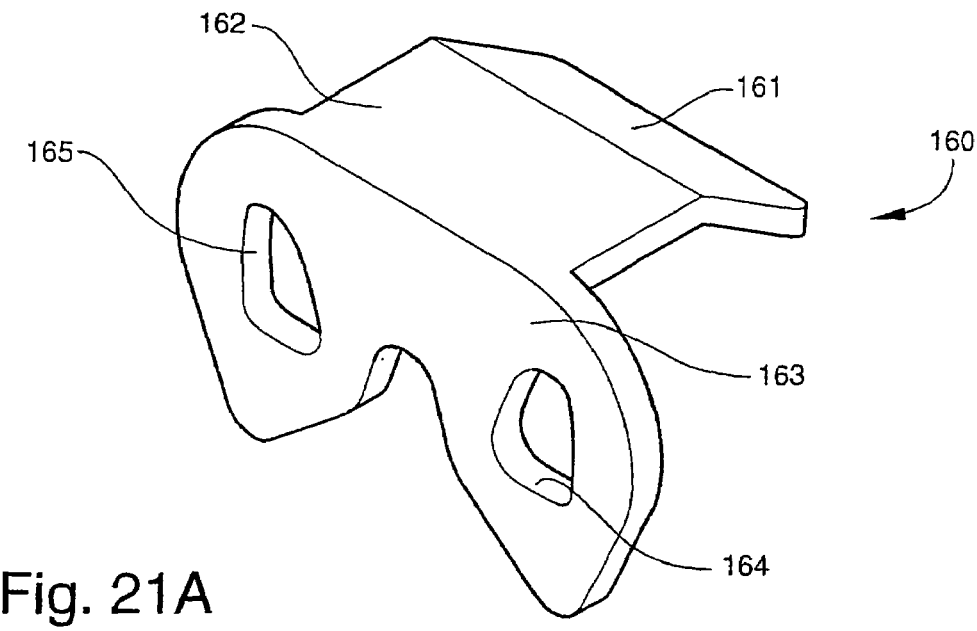
FIGS. 21A and 21B are a perspective view and a inner side elevation, respectively, of a further embodiment of a protector link according to the invention.
Figures 22, 23:
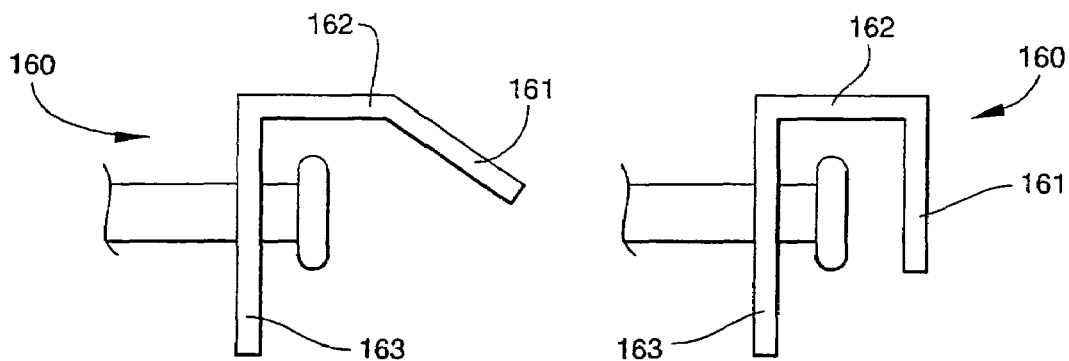
FIGS. 22 and 23 are side elevation views showing placement of the protector link according to FIGS. 21A-B onto the pins.
Figure 21B:
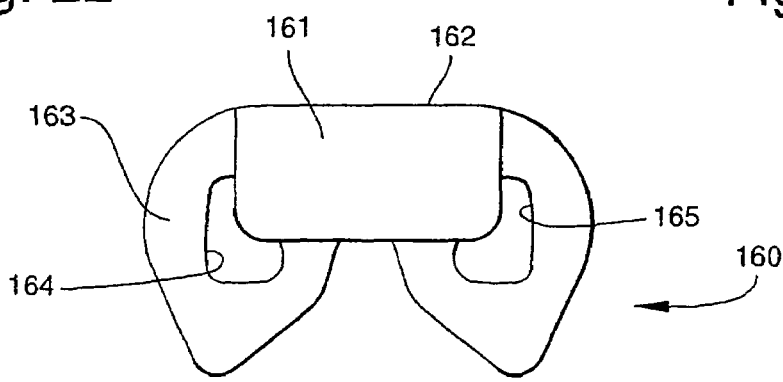
Figure 24A:
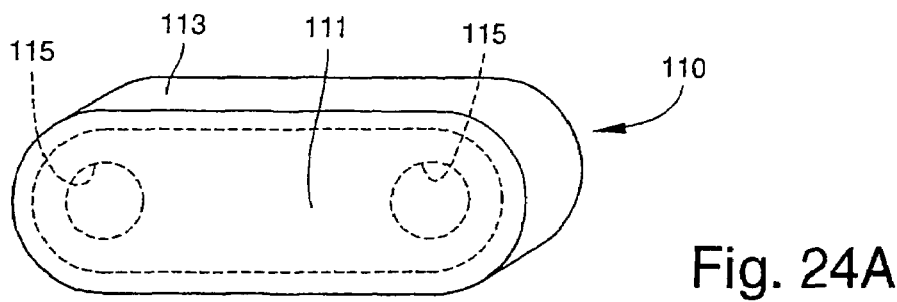
FIGS. 24A, 24B, and 24C are a front perspective, rear perspective and side elevation view, respectively, of a further embodiment of a protector link according to the invention.
Figure 24B:
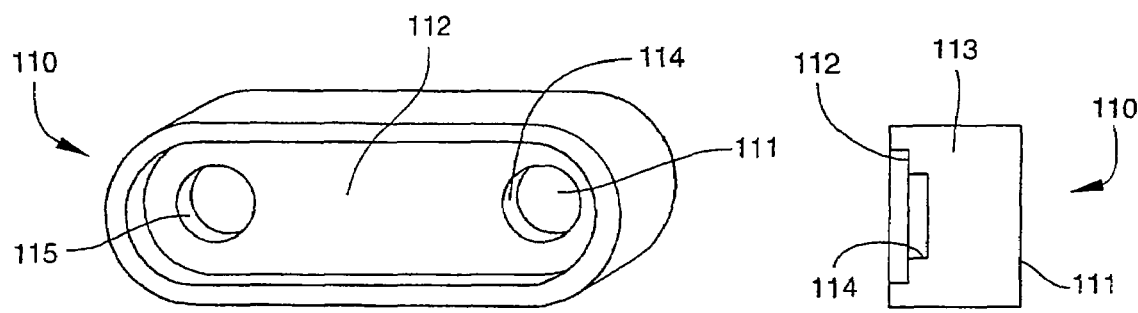
Figure 24C:
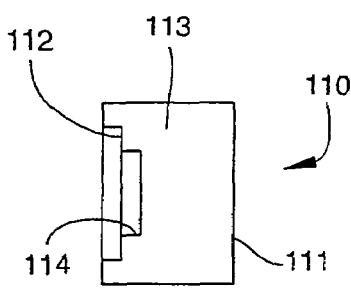

Referring now specifically to FIGS. 21A-B and 22-23, a protector link 160 has an outer wall 161, a top wall 162, and an inner wall 163. The inner wall 163 includes two retainer apertures 164, 165 into which pins are fitted. The bottom extent of the inner wall 163 is shaped with a peripheral geometry that is essentially the same as other links within the chain and is designed to engage sprockets and transmit power or motion, as referenced above. As is best shown in FIGS. 21A and 22, the outer wall 161 is at an oblique angle to the top spacer wall 162 and in a non-parallel orientation with the plane of the inner wall 163. In this configuration the pins are inserted into the retainer apertures 164, 165, as shown in FIG. 22. The outer wall 161 is then bent into parallel relationship with the inner wall 163, as shown in FIG. 23, capturing the heads of the pins in the space formed by the top spacer wall 162. The outer wall 161 protects the heads of the pins in the manner described above.

Connection of an assembled chain into an endless conveyor may require a modified link at the connection point. While not illustrated, the link would ordinarily have at least one hole available for inserting a last pin therethrough and laterally across the chain to connect the opposing ends of the chain into an endless assembly. The hole would be open to the outside to allow the last pin to be inserted from the outside. After insertion, a head would be formed on the headless end and any required adjustment carried out.

An end protector link according to several embodiments of the invention is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An end protector link for capturing and retaining first and second elongate link pins of a multi-link conveyor chain, comprising:
   (a) an outer wall defining a protective bearing surface;
   (b) an inner wall carried in spaced-apart relation to the outer wall and having a retainer aperture for capturing and retaining respective enlarged heads of the first and second link pins between facing surfaces of the outer wall and the inner wall; and
   (c) the protective bearing surface of the outer wall adapted for being engaged by wearing surfaces past which the conveyor moves and protecting the enlarged heads of the link pins to exposure to said wearing surfaces.

2. An end protector link according to claim 1, wherein the inner wall and the outer wall define a spacer wall therebetween and the spacer wall is normal to the inner wall and the outer wall, and the inner wall and outer wall reside in spaced-apart parallel planes relative to each other.

3. An end protector link according to claim 1, wherein the inner wall includes an opening sized to allow the link pin but not the enlarged head of the link pin to pass therethrough when the link pin is in an operative position within the link.

4. An end protector link according to claim 1, wherein opposing side edges of the inner and outer walls taper towards each other in a direction away from the spacer wall.

5. An end protector link according to claim 1, wherein the inner wall and outer wall are carried in spaced-apart relation by an intermediate spacer wall.

6. An end protector link according to claim 1, wherein the retainer aperture comprises a single opening in the inner wall adapted for receiving the first and second link pins, the retainer aperture having a centrally-disposed opening sufficiently large to successively receive the enlarged heads of the first and second link pins, and first and second laterally-disposed openings on opposite sides of the centrally-disposed opening, each of the first and second laterally-disposed openings being sufficiently small to retain the enlarged heads of the link pins between the facing surfaces of the outer wall and the inner wall.

7. A multi-link conveyor chain including the end protector link of claims 1, 2, 3, 4, 5, or 6, and including a plurality of conveyor links interconnected in a lengthwise direction and a widthwise direction by a plurality of pairs of the link pins to form a conveyor having a horizontal supporting surface for transporting successive items downstream in a processing line by engagement with a driving element.

8. A method of protecting capturing and retaining first and second elongate link pins of a multi-link conveyor chain, comprising the steps of:
   (a) providing an end protector link, comprising:
      (i) an outer wall defining a protective bearing surface;
      (ii) an inner wall carried in spaced-apart relation to the outer wall and having a retainer aperture for capturing and retaining respective enlarged heads of the first and second link pins between facing surfaces of the outer wall and the inner wall; and
      (iv) the protective bearing surface of the outer wall adapted for being engaged by wearing surfaces past which the conveyor moves and protecting the enlarged heads of the link pins to exposure to said wearing surfaces;
   (b) positioning the respective enlarged heads of the first and second link pins between the facing surfaces of the outer wall and the inner wall; and
   (c) manipulating the end protector link to retain the respective enlarged heads of the first and second link pins between the facing surfaces of the outer wall and the inner wall.

9. A method according to claim 8, wherein the step of manipulating the end protector link comprises the step of connecting the end protector link to a plurality of conveyor links by means of the link pins whereby the link pins are locked in spaced relation to each other and to the conveyor links.

10. A method according to claim 8, wherein the step of manipulating the end protector link comprises the step of bending the outer wall from an initial outwardly-extending oblique link pin loading position to a link pin locking position wherein the plane of the outer wall is parallel to the plane of the inner wall with the heads of the link pins captured therebetween.

11. A method according to claim 8, wherein the step of manipulating the end protector link comprises the step of bending two opposed segments of the outer wall from respective, initial outwardly-extending oblique link pin loading positions to respective link pin locking positions wherein the plane of the first and second outer wall segments are parallel to the plane of the inner wall with the head of a respective link pin captured by a respective one of the first and second outer wall segments.

12. An end protector link for capturing and retaining first and second elongate link pins of a multi-link conveyor chain, comprising:
   (a) an outer wall defining a protective bearing surface;
   (b) an inner wall carried in spaced-apart relation to the outer wall and having a retainer aperture for capturing and retaining respective enlarged heads of the first and second link pins between facing surfaces of the outer wall and the inner wall; and
   (c) the protective bearing surface of the outer wall adapted for being engaged by wearing surfaces past which the conveyor moves and protecting the enlarged heads of the link pins to exposure to said wearing surfaces.

13. An end protector link for capturing and retaining first and second elongate link pins of a multi-link conveyor chain, comprising:
   (a) an outer wall defining a protective bearing surface;
   (b) an inner wall carried in spaced-apart relation to the outer wall and having a retainer aperture for capturing and retaining respective enlarged heads of the first and second link pins between facing surfaces of the outer wall and the inner wall;
   (c) the protective bearing surface of the outer wall adapted for being engaged by wearing surfaces past which the conveyor moves and protecting the enlarged heads of the link pins to exposure to said wearing surfaces; and
   (d) the inner wall and the upper wall defining therebetween an upper surface adapted for being laterally aligned with an upper surface of the conveyor chain to facilitate lateral movement of conveyed items from the conveyor chain to an adjacent support.

\* \* \* \* \*

UNITED STATES PATENT AND TRADEMARK OFFICE
CERTIFICATE OF CORRECTION

PATENT NO.        : 7,600,632 B2                                                Page 1 of 1
APPLICATION NO.   : 10/534854
DATED             : October 13, 2009
INVENTOR(S)       : William C. Hall It is certified that error appears in the above-identified patent and that said Letters Patent is hereby corrected as shown below:

Column 11, line 12, delete "protecting capturing" and enter --protecting, capturing,--.

Column 11, line 23, delete "(iv)" and enter --(iii)--.

Signed and Sealed this

Twenty-third Day of March, 2010

David J. Kappos
*Director of the United States Patent and Trademark Office*